United States Patent

Puhov et al.

(10) Patent No.: US 10,013,323 B1
(45) Date of Patent: Jul. 3, 2018

(54) PROVIDING RESILIENCY TO A RAID GROUP OF STORAGE DEVICES

(71) Applicant: EMC Corporation, Hopkinton, MA (US)

(72) Inventors: Peter Puhov, Shrewsbury, MA (US); Ronald D. Proulx, Boxborough, MA (US); Wayne E. Garrett, Bellingham, MA (US); Ashok Tamilarasan, Shrewsbury, MA (US); Eric Petsching, Oxford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 71 days.

(21) Appl. No.: 14/868,577

(22) Filed: Sep. 29, 2015

(51) Int. Cl.
*G06F 11/00* (2006.01)
*G06F 11/20* (2006.01)
*G06F 3/06* (2006.01)

(52) U.S. Cl.
CPC ........ *G06F 11/2094* (2013.01); *G06F 3/0619* (2013.01); *G06F 3/0634* (2013.01); *G06F 3/0689* (2013.01); *G06F 2201/805* (2013.01); *G06F 2201/85* (2013.01)

(58) Field of Classification Search
CPC combination set(s) only.
See application file for complete search history.

(56) References Cited

U.S. PATENT DOCUMENTS

| 6,079,029 | A  | * | 6/2000 | Iwatani | G06F 11/1084 714/6.12 |
| 8,473,779 | B2 | * | 6/2013 | Siewert | G06F 11/008 711/118 |
| 2002/0049845 | A1 | | 4/2002 | Sreenivasan et al. | |
| 2005/0114726 | A1 | | 5/2005 | Ouchi | |
| 2005/0114728 | A1 | * | 5/2005 | Aizawa | G06F 11/008 714/6.32 |
| 2006/0206662 | A1 | | 9/2006 | Ludwig et al. | |
| 2010/0332748 | A1 | | 12/2010 | van der Goot et al. | |
| 2012/0226961 | A1 | | 9/2012 | Lumb et al. | |
| 2013/0067294 | A1 | | 3/2013 | Flynn et al. | |
| 2013/0339407 | A1 | | 12/2013 | Sharpe et al. | |
| 2016/0048408 | A1 | | 2/2016 | Madhu et al. | |

* cited by examiner

*Primary Examiner* — Amine Riad
(74) *Attorney, Agent, or Firm* — BainwoodHuang (57) ABSTRACT

A technique is directed to providing resiliency to a redundant array of independent disk (RAID) group which includes multiple storage devices. The technique involves operating the RAID group in a normal state in which each storage device is (i) initially online to perform write and read operations and (ii) configured to go offline in response to a respective media error count for that storage device reaching an initial take-offline threshold. The technique further involves receiving a notification that a storage device of the RAID group has encountered a particular error situation. The technique further involves transitioning, in response to the notification, the RAID group to a high resiliency state in which each storage device that is operable is (i) still online to perform write and read operations and (ii) configured to stay online even when the respective media error count for that storage device reaches the initial take-offline threshold.

23 Claims, 5 Drawing Sheets

PROVIDING RESILIENCY TO A RAID GROUP OF STORAGE DEVICES

BACKGROUND

A redundant array of independent disks (RAID) group includes multiple disks for storing data. For RAID Level 5, storage processing circuitry stripes data and parity across the disks of the RAID group in a distributed manner.

In one conventional RAID Level 5 implementation, the storage processing circuitry brings offline any failing disks that encounter a predefined number of media errors. Once the storage processing circuitry brings a failing disk offline, the storage processing circuitry is able to reconstruct the data and parity on that disk from the remaining disks (e.g., via logical XOR operations).

SUMMARY

Unfortunately, there are deficiencies to the above-described conventional RAID Level 5 implementation in which the storage processing circuitry brings offline any failing disks that encounter a predefined number of media errors. For example, once the failing disk is brought offline, the entire RAID group is now in a vulnerable degraded state which is easily susceptible to unavailability. In particular, if a second disk encounters the predefined number of media errors, the storage processing circuitry will bring the second disk offline thus making the entire RAID group unavailable.

As another example, before a failing disk reaches the predefined number of media errors, suppose that the storage processing circuitry starts a proactive copy process to proactively copy data and parity from the failing disk to a backup disk in an attempt to avoid or minimize data and parity reconstruction. In this situation, the proactive copy process may actually increase the number of media errors encountered by the failing disk due to the additional copy operations caused by the proactive copy process. Accordingly, the proactive copy process may actually promote or cause the storage processing circuitry to bring the failing disk offline sooner.

In contrast to the above-described conventional situations which can make a RAID group unavailable (e.g., bringing a second disk offline in response to media errors) or which can degrade a RAID group (e.g., accelerating bringing an initial disk offline in response to a proactive copy process), improved techniques provide resiliency to a RAID group by raising and/or disabling certain thresholds. In particular, when a notification indicates that a storage device has encountered a particular error situation, the RAID group transitions from a normal operating state to a high resiliency degraded state in which each storage device that is operable is (i) still online to perform input/output (I/O) operations and (ii) configured to stay online even when a media error count for that storage device reaches a threshold that would normally bring that storage device offline. Accordingly, the RAID group does not become further degraded or unavailable. Rather, the RAID group continues to operate even if further media errors cause the initial thresholds to be exceeded. Such operation is particularly well-suited for situations in which it is better to have slow I/O rather than take a storage device offline which could result in data loss or loss of access to the data.

One embodiment is directed to a computer-implemented method of providing resiliency to a redundant array of independent disk (RAID) group which includes a plurality of storage devices. The method includes operating the RAID group in a normal state in which each storage device is (i) initially online to perform write and read operations and (ii) configured to go offline in response to a respective media error count for that storage device reaching an initial take-offline threshold. The method further includes receiving a notification that a storage device of the RAID group has encountered a particular error situation. The method further includes transitioning, in response to the notification, the RAID group from the normal state to a high resiliency degraded state in which each storage device that is operable is (i) still online to perform write and read operations and (ii) configured to stay online even when the respective media error count for that storage device reaches the initial take-offline threshold.

In some arrangements, transitioning the RAID group from the normal state to the high resiliency degraded state includes configuring each storage device that is operable to remain online regardless of the respective media error count for that storage device. For example, the thresholds used to bring storage devices offline are disabled.

In some arrangements, receiving the notification that the storage device of the RAID group has encountered the particular error situation includes receiving, as the notification, an alert indicating that the storage device has gone offline in response to a respective media error count for the storage device reaching the initial take-offline threshold. With one storage device offline, the other storage devices remain online to maintain RAID group availability.

In some arrangements, receiving the notification that the storage device of the RAID group has encountered the particular error situation includes receiving, as the notification, an alert indicating that a proactive copy operation has begun in response to an accounting for the storage device reaching an end-of-life threshold. In these arrangements, the proactive copy operation involves proactively copying data from the storage device of the RAID group to a spare storage device. However, the storage devices will remain operational even if there media errors exceed the initial take-offline threshold.

In some arrangements, processing circuitry maintains a hierarchy of objects representing the RAID group. In these arrangements, receiving the notification that the storage device of the RAID group has encountered the particular error situation includes obtaining, by a RAID group object of the hierarchy, an alert indicating existence of the particular error situation, the RAID group object representing the RAID group.

In some arrangements, transitioning the RAID group from the normal state to the high resiliency degraded state includes providing a respective don't-take-offline command from the RAID group object of the hierarchy to each storage device object of the hierarchy. In these arrangements, each storage device object of the hierarchy represents an actual storage device of the RAID group.

Another embodiment is directed to a computer program product having a non-transitory computer readable medium which stores a set of instructions to provide resiliency to a redundant array of independent disk (RAID) group which includes a plurality of storage devices. The set of instructions, when carried out by computerized circuitry, causes the computerized circuitry to perform a method of:

(A) operating the RAID group in a normal state in which each storage device is (i) initially online to perform write and read operations and (ii) configured to go offline in response to a respective media error count for that storage device reaching an initial take-offline threshold;

(B) receiving a notification that a storage device of the RAID group has encountered a particular error situation; and (C) in response to the notification, transitioning the RAID group from the normal state to a high resiliency degraded state in which each storage device that is operable is (i) still online to perform write and read operations and (ii) configured to stay online even when the respective media error count for that storage device reaches the initial take-offline threshold.

Another embodiment is directed to data storage equipment which includes a set of host interfaces to interface with a set of host computers, a redundant array of independent disk (RAID) group which includes a plurality of storage devices to store host data on behalf of the set of host computers, and control circuitry coupled to the set of host interfaces and the RAID group. The control circuitry is constructed and arranged to:

(A) operate the RAID group in a normal state in which each storage device is (i) initially online to perform write and read operations and (ii) configured to go offline in response to a respective media error count for that storage device reaching an initial take-offline threshold, (B) receive a notification that a storage device of the RAID group has encountered a particular error situation, and (C) in response to the notification, transition the RAID group from the normal state to a high resiliency degraded state in which each storage device that is operable is (i) still online to perform write and read operations and (ii) configured to stay online even when the respective media error count for that storage device reaches the initial take-offline threshold.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in providing resiliency to a RAID group via raising or disabling certain thresholds.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to providing resiliency to a redundant array of independent disks (RAID) group by raising and/or disabling certain thresholds. Along these lines, when a notification signal indicates that a storage device of the RAID group has encountered a particular error situation, the RAID group transitions from a normal operating state to a high resiliency degraded state in which each operable storage device is (i) still online to perform input/output (I/O) operations and (ii) configured to stay online even when a media error count for that operable storage device reaches a threshold that would normally bring that operable storage device offline. As a result, the RAID group does not become unavailable or further degraded. Rather, the RAID group continues to operate even if further media errors cause the initial thresholds to be exceeded. Such operation is particularly well-suited for situations in which it is better to have slow I/O rather than take an operable storage device offline which could result in data loss or loss of access to the data.

Figure 1:
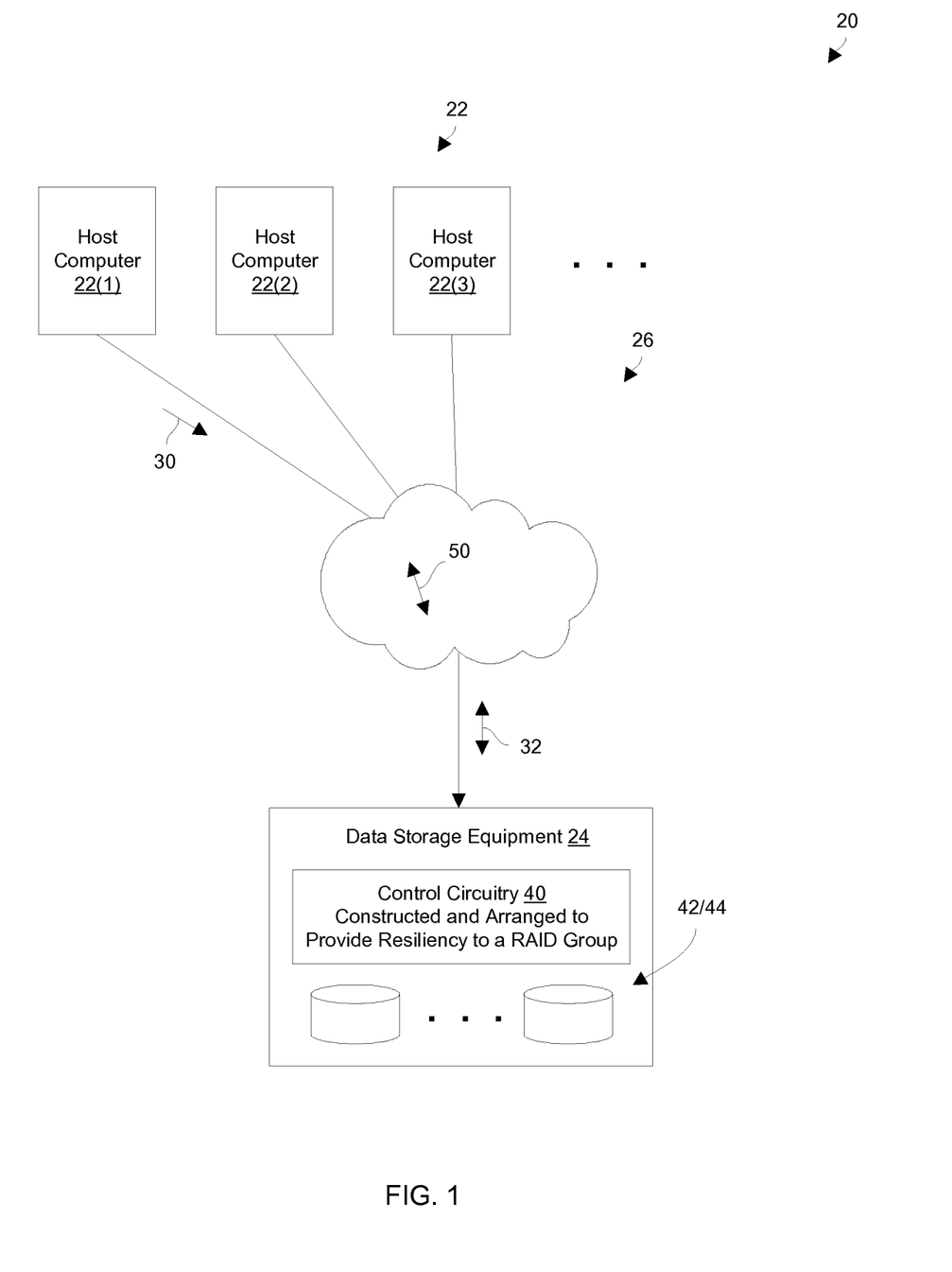
FIG. 1 is a block diagram of a data storage environment which provides resiliency to a RAID group by raising or disabling certain thresholds.

FIG. 1 is a block diagram of a data storage environment 20 which provides resiliency to a RAID group by raising or disabling certain thresholds. The data storage environment 20 includes host computers 22(1), 22(2), 22(3), . . . (collectively, host computers 22), data storage equipment 24, and a communications medium 26.

Each host computer 22 is constructed and arranged to perform useful work. For example, a host computer 22 may operate as a web server, a file server, an email server, an enterprise server, and so on, which provides I/O requests 30 (e.g., small computer system interface or SCSI commands) to the data storage equipment 24 to store host data 32 in and read host data 32 from the data storage equipment 24.

The data storage equipment 24 includes control circuitry 40 and a RAID group 42 having storage devices 44 (e.g., solid state drives, magnetic disk drivers, etc.). The control circuitry 40 may be formed by one or more physical storage processors, data movers, director boards, blades, I/O modules, storage drive controllers, switches, combinations thereof, and so on. The control circuitry 40 is constructed and arranged to process the I/O requests 30 from the host computers 22 by robustly and reliably storing host data 32 in the RAID group 42 and retrieving the host data 32 from the RAID group 42. Additionally, as will be explained in further detail shortly, the control circuitry 40 provides resiliency to the RAID group 42 by raising and/or disabling certain thresholds in response to an error situation. Accordingly, the host data 32 remains available to the host computers 22 with higher tolerance to further errors even following the initial error situation.

The communications medium 26 is constructed and arranged to connect the various components of the data storage environment 20 together to enable these components to exchange electronic signals 50 (e.g., see the double arrow 50). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, cellular communications, combinations thereof, etc.

During operation, the control circuitry 40 of the data storage equipment 24 processes the I/O requests 30 from the host computers 22. In particular, the control circuitry stores host data 32 in the RAID group 42 and loads host data from the RAID group 42 on behalf of the host computers 22.

At some point, the control circuitry 40 may detect that a particular storage device 44 of the RAID group 42 has encountered a particular error situation. For example, the number of media errors for the particular storage device 44 may have exceeded an initial take-offline threshold causing that storage device 44 to go offline. As another example, the number of media errors for the particular storage device 44 may have reached a proactive copy threshold causing the control circuitry 40 begin a proactive copy process which copies data and parity from the particular storage device 44 to a spare storage device 44 in an attempt to avoid having to reconstruct the data and parity on the particular storage device 44.

In response to such an error situation, the control circuitry 40 adjusts the failure tolerance of the data storage equipment 24 so that the operable storage devices 44 stay online even if an operating storage device 44 reaches the initial take-offline threshold. In particular, the control circuitry 40 raises or disables the initial take-offline threshold for the storage devices 44 so that the operable storage devices 44 of the RAID group 42 remain online and continue to operate even if the number of media errors for another storage device 44 exceeds the initial take-offline threshold. Accordingly, although response times may be slower than normal, the host computers 22 are able to continue accessing host data 32 in the RAID group 42. Further details will now be provided with reference to FIG. 2.

Figure 2:
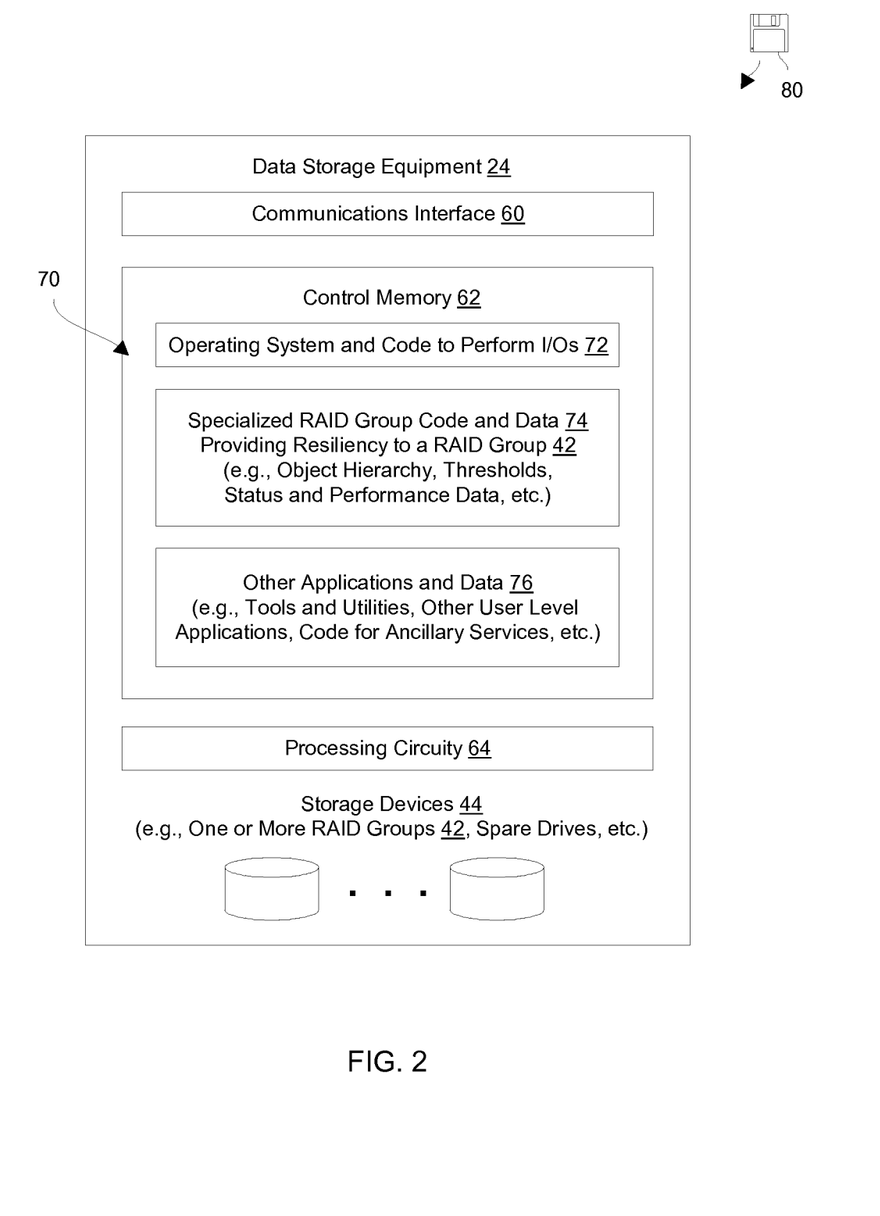
FIG. 2 is a block diagram of particular data storage equipment of the data storage environment of FIG. 1.

FIG. 2 shows particular details of the data storage equipment 24 (also see FIG. 1). The data storage equipment 24 includes a communications interface 60, control memory 62, and processing circuitry 64, and a set of storage devices 44.

The communications interface 60 is constructed and arranged to connect the data storage equipment 24 to the communications medium 26 (also see FIG. 1) to enable communications with other apparatus of the data storage environment 20 (e.g., the host computers 22). Such communications may be IP-based, SAN-based, cellular-based, cable-based, fiber-optic based, wireless, combinations thereof, and so on. Accordingly, the communications interface 60 enables the data storage equipment 24 to robustly and reliably communicate with other external equipment.

The control memory 62 is intended to represent both volatile storage (e.g., DRAM, SRAM, etc.) and non-volatile storage (e.g., flash memory, magnetic memory, etc.). The control memory 62 stores a variety of software constructs 70 including an operating system and code to perform host I/O operations 72, specialized RAID Group code and data 74, and other applications and data 76. The operating system and code to perform host I/O operations 72 is intended to refer to code such as a kernel to manage computerized resources (e.g., processor cycles, memory space, etc.), drivers (e.g., an I/O stack), core data moving code, and so on. The specialized RAID group code and data 74 includes instructions and information to provide resiliency to one or more RAID groups to improve RAID group availability. The other applications and data 76 include administrative tools, utilities, other user-level applications, code for ancillary services, and so on.

The processing circuitry 64 is constructed and arranged to operate in accordance with the various software constructs 70 stored in the control memory 62. In particular, the processing circuitry 64 executes portions of the various software constructs 70 to form the control circuitry 40 (also see FIG. 1). Such processing circuitry 64 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software constructs 70 to the data storage equipment 24. Along these lines, the computer program product 80 has a non-transitory (or non-volatile) computer readable medium which stores a set of instructions which controls one or more operations of the data storage equipment 24. Examples of suitable computer readable storage media include tangible articles of manufacture and apparatus which store instructions in a non-volatile manner such as CD-ROM, flash memory, disk memory, tape memory, and the like.

The storage devices 44 refer to solid state drives (SSDs), magnetic disk drives, combinations thereof, etc. The storage devices 44 may form one or more RAID groups 42 for holding information such as the host data 32, as well as spare drives (e.g., storage devices on hot standby). In some arrangements, some of the control memory 62 is formed by a portion of the storage devices 44. It should be understood that a variety of RAID Levels are suitable for use, e.g., RAID Level 4, RAID Level 5, RAID Level 6, and so on.

During operation, the processing circuitry 64 executes the specialized RAID group code and data 74 to form the control circuitry 40 (FIG. 1) which provides resiliency to a RAID group 42. Along these lines, such execution forms a hierarchy of object instances (or simply objects) representing various parts of the RAID group 42 (e.g., a RAID group object to represent the RAID group 42 itself, individual storage device objects to represent the storage devices 44 of the RAID group 42, etc.).

It should be understood that each object of the object hierarchy is able to monitor events and exchange messages with other objects (e.g., commands and status). Along these lines, when a storage device 44 encounters a media error, the storage device object that represents that storage device 44 increments a media error tally for that storage device. If the storage device object then determines that the storage device 44 encountered a particular situation due to incrementing the media error tally, the storage device object may perform a particular operation.

For example, the storage device object may determine that the number of media errors for a failing storage device 44 has surpassed an initial take-offline threshold. In such a situation, the storage device object may take the failing storage device 44 offline. In response, the RAID group object that represents the RAID group 42 which includes the failing storage device 44 will detect the loss of that storage device 44 and thus transition from a normal state to a degraded state. Also, as will be explained in further detail shortly, the RAID group object may send commands to the remaining storage device objects that either raise or disable the initial take-offline threshold to prevent another storage device object from taking its storage device 44 offline. Accordingly, the RAID group 42 is now more resilient.

As another example, the storage device object may determine that the number of media errors for a failing storage device 44 reaches a proactive copy threshold. In such a situation, the storage device object may invoke a proactive copy process to proactively copy data and parity from the failing storage device 44 (i.e., the source) to a spare storage device 44 (i.e., the destination). Such a process attempts to eventually replace the failing storage device 44 with spare storage device 44 and thus avoid having to reconstruct all of the data and parity on the failing storage device 44. In the proactive copy situation and as will be explained in further detail shortly, the proactive copy process may add further media errors. Accordingly, the RAID group object may send commands to the storage device objects that either raise or disable the initial take-offline threshold to prevent the storage device object from taking its storage device 44 offline. As a result, the RAID group 42 is now more resilient to failure. Further details will now be provided with reference to FIG. 3.

Figure 3:
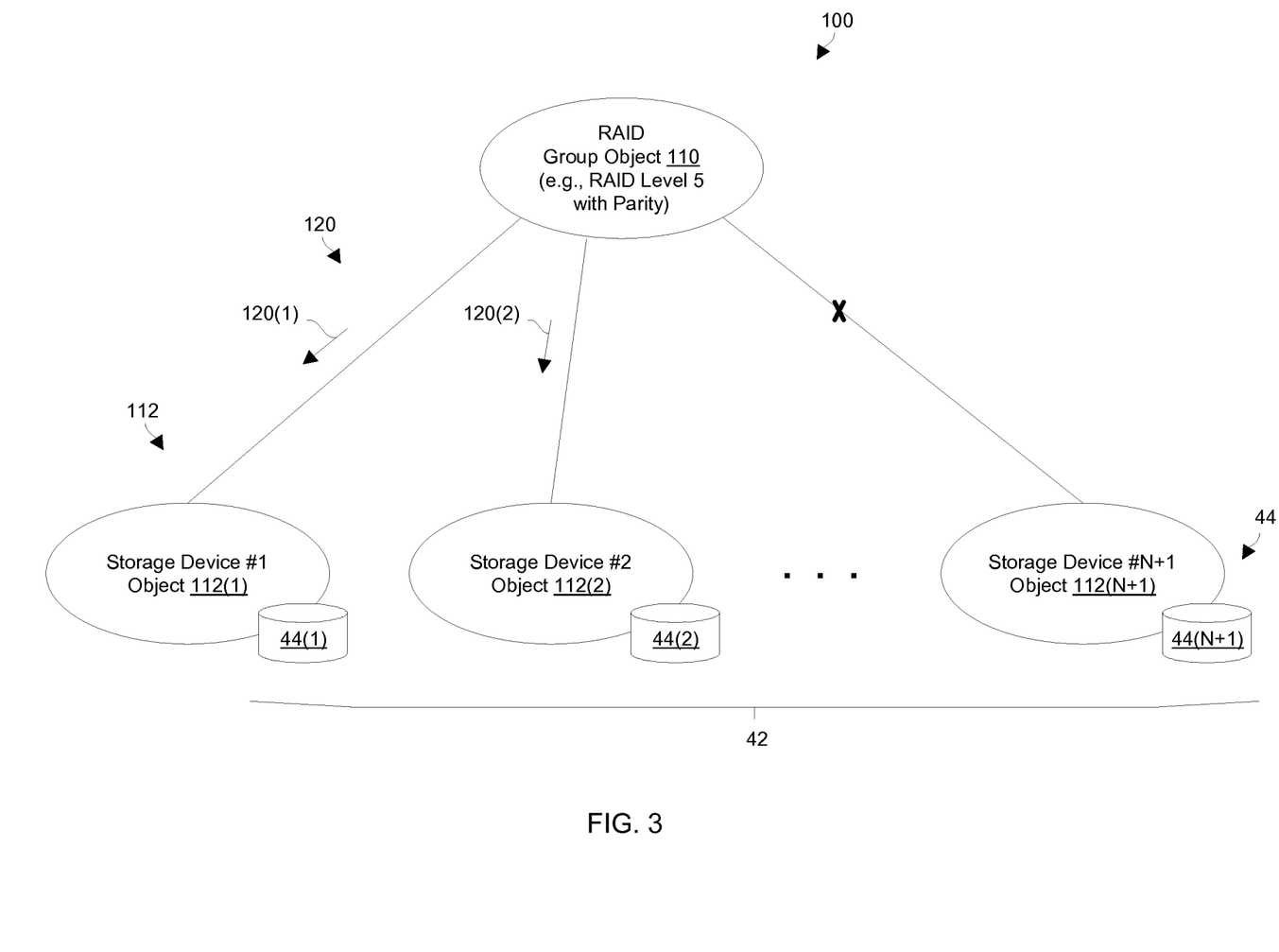
FIG. 3 is a block diagram illustrating particular details of a first error situation.

FIG. 3 is a block diagram illustrating particular details of how the data storage equipment 24 handles a first error situation. As shown in FIG. 3, the data storage equipment 24 manages a RAID group 42 using an object hierarchy 100. The object hierarchy 100 includes a RAID group object 110, and storage device objects 112(1), 112(2), . . . , 112(N+1) (collectively, storage device objects 112). It should be understood that the term N+1 is used by way of example since, in this example, there are N data portions and 1 parity portion (hence N+1) for each stripe across the RAID group 42.

One should appreciate that the object hierarchy 100 has the form of an inverted tree of objects or nodes. In particular, the storage device objects 112 appear to be leafs or children of the RAID group object 110. Additionally, the RAID group object 110 appears as a root or parent of the storage device objects 112.

The RAID group object 110 is constructed and arranged to represent the RAID group 42 (also see FIG. 1). In particular, the RAID group object 110 monitors and handles events at the RAID level. To this end, the RAID group object 110 communicates with the storage device objects 112 and stores particular types of information such as a RAID group state (e.g., "normal", "degraded", "broken", etc.). Additionally, the RAID group object 110 issues commands and queries to other objects of the object hierarchy 100 such as the storage device objects 112. It should be understood that it is actually the processing circuitry 64 executing code of the RAID group object 110 that is performing such operations (also see FIG. 2).

Similarly, the storage device objects 112 are constructed and arranged to represent the storage devices 44 of the RAID group 42 (also see FIG. 1). In particular, each storage device object 112 (i.e., the processing circuitry 64 executing code of the storage device object 112) monitors and handles events for a particular storage device 44. To this end, each storage device object 112 maintains a current count of media errors for the particular storage device 44 and compares that count to various thresholds to determine whether any action should be taken. Along these lines, the storage device object 112(1) monitors and handles events for a storage device 44(1), the storage device object 112(2) monitors and handles events for a storage device 44(2), and so on.

Initially, suppose that all of the storage devices 44 of the RAID group 42 are fully operational and in good health. Accordingly, the RAID group object 110 starts in a normal state. During this time, each storage device object 112 maintains a current media error count for its respective storage device 44. If a storage device object 112 detects that its storage device 44 has encountered a new media error, the storage device object increments its current media error count and compares that count to the initial media error threshold. If the count does not exceed the initial media error threshold, the storage device object 112 keeps the storage device 44 online. However, if the count exceeds the initial media error threshold, the storage device object 112 brings the storage device 44 offline.

Now, suppose that the storage device object 112(N+1) detects a media error for its storage device 44(N+1) and that, upon incrementing the current media error count for the storage device 44(N+1), the storage device object 112(N+1) determines that the count surpasses the initial media error threshold. In response to this error situation, the storage device object 112(N+1) takes the storage device 44(N+1) offline (illustrated by the "X" in FIG. 3).

At this point, the RAID group object 110 detects that the storage device 44(N+1) has gone offline, and sends don't-take-offline (DTO) commands 120(1), 120(2), . . . to the storage device objects 112(1), 112(2), . . . that represent the storage devices 44(1), 44(2), . . . that are still online. In some arrangements, these DTO commands 120 direct the storage device objects 112 to raise the initial media error threshold to a higher media error threshold so that the remaining storage devices 44 are more resilient to media errors (i.e., the remaining storage devices 44 are able to endure a larger number of media errors than the storage device 44(N+1) that went offline). In other arrangements, these DTO commands 120 direct the storage device objects 112 to no longer take their respective storage devices 44 offline in response to media errors. Accordingly, the RAID group 42 is now more resilient to media errors. Such operation is well suited for situations where it is better for the RAID group 42 to remain available even if I/O response time is slower. Further details will now be provided with reference to FIG. 4

Figure 4:
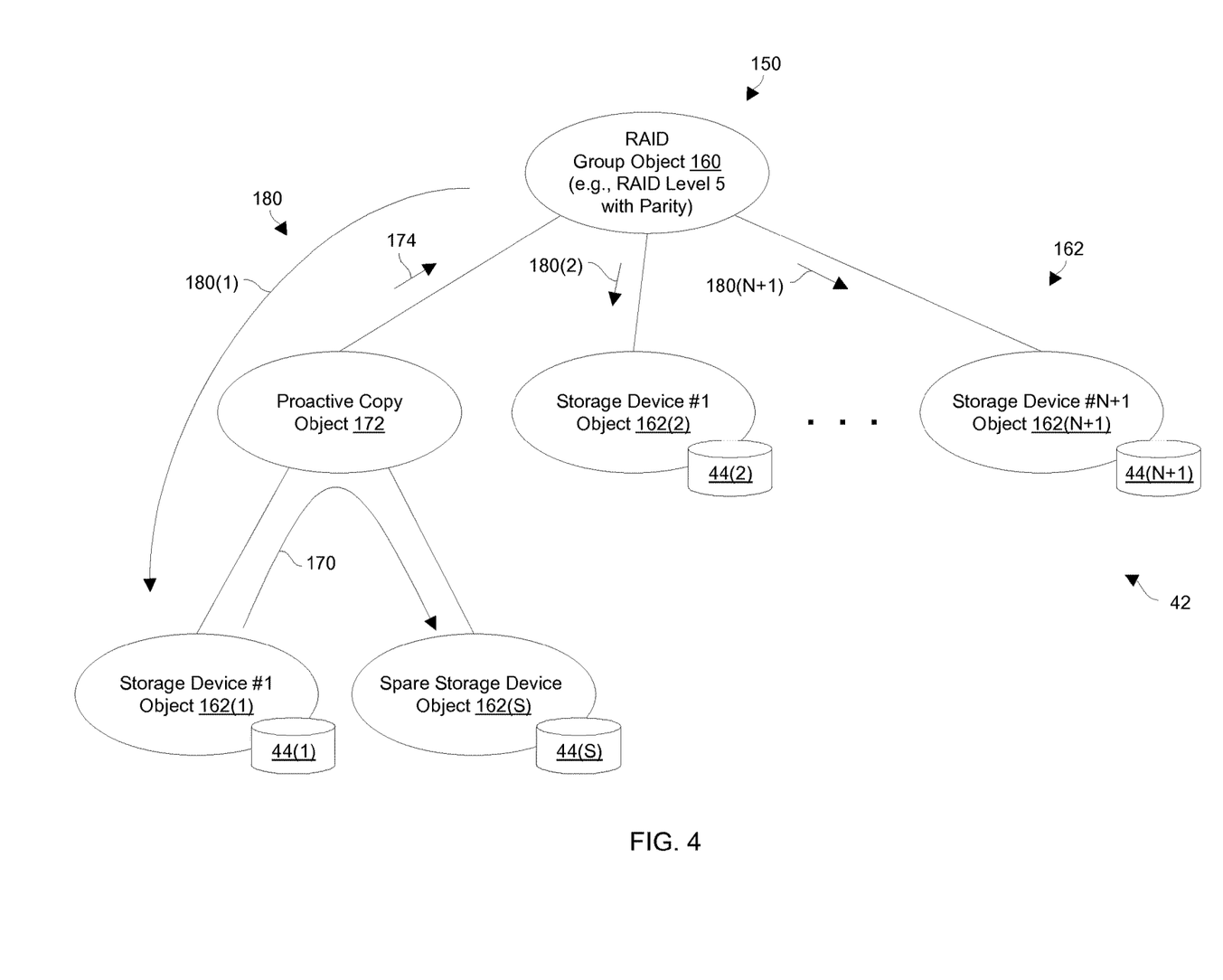
FIG. 4 is a block diagram illustrating particular details of a second error situation.

FIG. 4 is a block diagram illustrating particular details of how the data storage equipment 24 handles a second error situation. As shown in FIG. 4, the data storage equipment 24 manages a RAID group 42 of storage devices 44(1), . . . , 44(N+1) using an object hierarchy 150. The object hierarchy 150 includes a RAID group object 160, and storage device objects 162(1), 162(2), . . . , 162(N+1) (collectively, storage device objects 162).

As with the situation in FIG. 3, it should be understood that the term N+1 in FIG. 4 is used since there are N data portions and 1 parity portion (hence N+1) for each stripe across the RAID group 42. Furthermore, one should appreciate that the object hierarchy 150 has the form of an inverted tree of objects or nodes where the storage device objects 162 appear to be leafs or children of the RAID group object 160, and the RAID group object 160 appears as a root or parent of the storage device objects 162.

The RAID group object 160 is constructed and arranged to represent the RAID group 42 (also see FIG. 1). Accordingly, the RAID group object 160 monitors and handles events at the RAID level. To this end, the RAID group object 160 communicates with the storage device objects 162 and stores particular types of information such as a RAID group state (e.g., "normal", "degraded", "broken", etc.). Additionally, the RAID group object 160 issues commands and queries to other objects of the object hierarchy 150 such as the storage device objects 162. It should be understood that it is actually the processing circuitry 64 executing code of the RAID group object 160 that is performing these operations (also see FIG. 2).

Similarly, the storage device objects 162 are constructed and arranged to represent the storage devices 44 of the RAID group 42 (also see FIG. 1). In particular, each storage device object 162 (i.e., the processing circuitry 64 executing code of the storage device object 162) monitors and handles events for a particular storage device 44. To this end, each storage device object 162 maintains a current count of media errors for the particular storage device 44 and compares that count to various thresholds to determine whether any action should be taken. That is, the storage device object 162(1) monitors and handles events for a storage device 44(1), the storage device object 162(2) monitors and handles events for a storage device 44(2), and so on.

Initially, suppose that all of the storage devices 44 of the RAID group 42 are fully operational and in good health. Accordingly, the RAID group object 160 starts in a normal state. During this time, each storage device object 162 maintains a current media error count for its respective storage device 44. If a storage device object 162 detects that its storage device 44 has encountered a new media error, the storage device object increments its current media error count and compares that count to a proactive copy threshold. If the count does not exceed the proactive copy threshold, the storage device object 162 maintains normal operation of the storage device 44. However, if the count exceeds the proactive copy threshold, the storage device object 162 starts a proactive copy process to copy information (e.g., data and/or parity) from the storage device 44 to a spare storage device 44.

Now, suppose that the storage device object 162(1) detects a media error for its storage device 44(1) and that, upon incrementing the current media error count for the storage device 44(1), the storage device object 162(1) determines that the count surpasses the proactive copy threshold. i.e., the storage device object 162(1) concludes that the storage device 44(1) is failing. In response to this error situation, the storage device object 162(1) begins a series of copy operations 170 to copy information from the failing storage device 44(1) to a spare storage device 44(S) (e.g., an extra storage device 44 that is on hot standby).

To this end, the control circuitry 40 (FIG. 1) instantiates a proactive copy object 172 in response to detection of the error situation by the storage device object 162(1). As illustrated in FIG. 4, the proactive copy object 172 is integrated into the object hierarchy as a parent node of the storage device object 162(1) and a child node of the RAID group object 160. The proactive copy object 172 then sends a proactive copy notification 174 to the RAID group object 160 informing the RAID group object 160 that a proactive copy operation is underway. In response to the proactive copy notification 174 from the proactive copy object 172, the RAID group object sends don't-take-offline (DTO) commands 180(1), 180(2), . . . to the storage device objects 162(1), 162(2), . . . that represent storage devices 44(1), 44(2), . . . . In some arrangements, these DTO commands 180 direct the storage device objects 162 to raise the initial media error threshold to a higher media error threshold so that the proactive copy process does not accelerate bringing the failing storage device 44(1) offline (e.g., the failing storage device 44(1) is able to endure a larger number of media errors than initially). In other arrangements, these DTO commands 180 direct the storage device objects 162 to no longer take their respective storage devices 44 offline in response to media errors. Accordingly, the storage devices 44 are more resilient so there is less likelihood of one of the other storage devices 44 going offline during the proactive copy process. As a result, the RAID group 42 is now more resilient to media errors, i.e., the DTO commands 180 prevent the proactive copy process from promoting or causing the failing storage device 44(1) from going offline sooner.

Upon completion of the proactive copy process, the spare storage device 44(S) can be put in the RAID group 42 in place of the failing storage device 44(1). Any information associated with media errors on the failing storage device 44(1) can be recreated from the remaining storage devices 44(2), . . . , 44(N+1). Accordingly, the entire storage device 44(1) does not need to be reconstructed.

It should be understood that the first and second error situations of FIGS. 3 and 4 were provided above by way of example only. Other scenarios exist as well. Additionally, other types of objects and other arrangements for the object hierarchies 100, 150 are suitable for use. Further details will now be provided with reference to FIG. 5.

Figure 5:
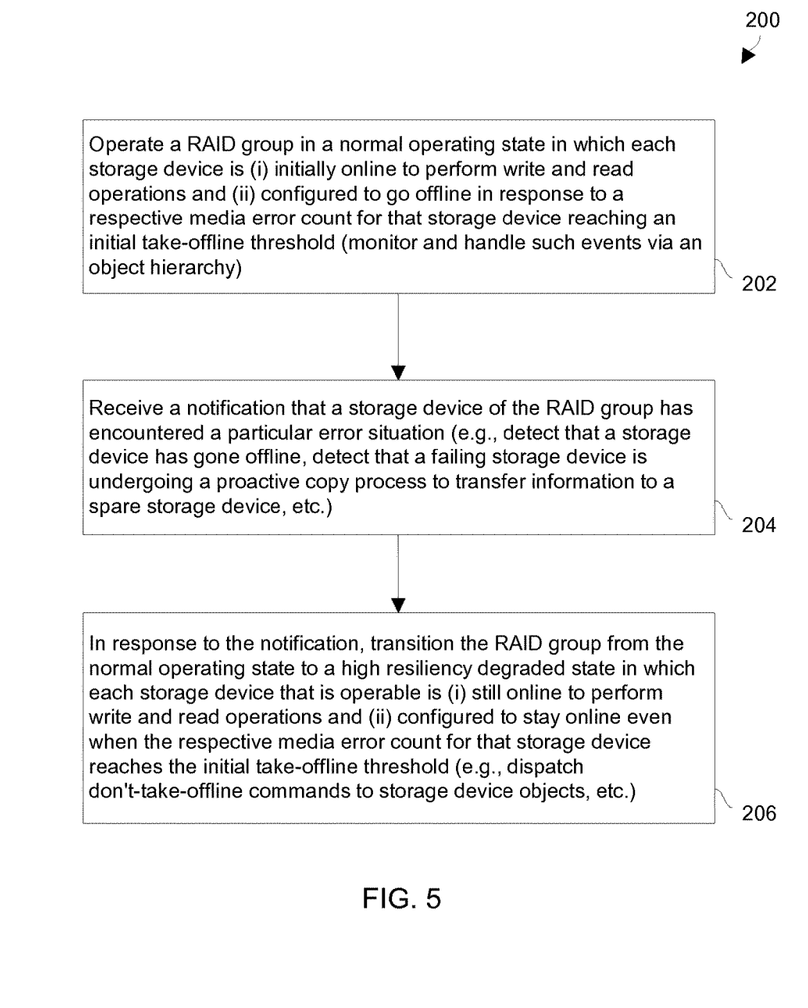
FIG. 5 is a flowchart of a procedure which is performed by the data storage equipment of FIG. 2.

FIG. 5 is a flowchart of a procedure 200 which is performed by the control circuitry 40 of the data storage equipment 24 (FIG. 2) to provide resiliency to a RAID group 42 which includes a plurality of storage devices 44. Such resiliency is well-suited for situations in which it is better for the RAID group 42 to stay available even though the I/Os may be very slow.

At 202, the control circuitry 40 operates the RAID group 42 in a normal state in which each storage device 44 is (i) initially online to perform write and read operations and (ii) configured to go offline in response to a respective media error count for that storage device reaching an initial take-offline threshold. Recall, that such monitoring and handling of the RAID group 42 can be accomplished via an object hierarchy (also see FIGS. 3 and 4).

At 204, the control circuitry 40 receives a notification that a storage device 44 of the RAID group 42 has encountered a particular error situation. For example, a RAID group object can receive a notification that a storage device 44 has gone offline (FIG. 3). As another example, the RAID group object can receive a notification that a proactive copy process has started in order to transfer information from a failing storage device 44 to a spare storage device 44 (FIG. 4).

At 206, the control circuitry 40 transitions, in response to the notification, the RAID group 42 from the normal state to a high resiliency degraded state in which each storage device 44 that is operable is (i) still online to perform write and read operations and (ii) configured to stay online even when the respective media error count for that storage device 44 reaches the initial take-offline threshold. For example, the RAID group object can dispatch don't-take-offline (DTO) commands to raise or disable initial media error thresholds and thus make the operable storage devices 44 of the RAID group 42 more resilient to failure.

As described above, improved techniques are directed to providing resiliency to a RAID group 42 by raising and/or disabling certain thresholds. In particular, when a notification indicates that a storage device 44 has encountered a particular error situation, the RAID group 42 transitions from a normal operating state to a high resiliency degraded state in which each storage device 44 that is operable is (i) still online to perform input/output (I/O) operations and (ii) configured to stay online even when a media error count for that storage device 44 reaches a threshold that would normally bring that storage device 44 offline. Accordingly, the RAID group does not become further degraded or unavailable. Rather, the RAID group 42 continues to operate even if further media errors cause the initial thresholds to be exceeded. Such operation is particularly well-suited for situations in which it is better to have slow I/O rather than take a storage device 44 offline which could result in data loss or loss of access to the data.

One should appreciate that the above-described techniques do not merely monitor and report status among objects. Rather, the disclosed techniques involve changing the operating behavior of a RAID group 42 to make storage devices 44 more resilient to going offline following an error situation. Such techniques augment an already-existing technological challenge of simply operating a RAID group.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

Additionally, it should be understood that when a RAID group 42 enters the high resiliency degraded state, the control circuitry 40 can disable some thresholds and modify other thresholds. For example, the control circuitry 40 can disable use of take-offline threshold (e.g., to add resiliency to the RAID group 42) and modify the proactive copy threshold (e.g., to resist starting another proactive copy process that could further strain the RAID group 42), etc.

Furthermore, it should be understood that RAID Level 5 with N+1 storage devices was used in connection with the scenarios of FIGS. 3 and 4 by way of example only. The above-described resiliency improvements can be utilized with other RAID levels as well (e.g., RAID Level 4, RAID Level 6, etc.). Furthermore, such improvements can be used in connection with N+2 storage devices, N+3 storage devices, and so on. Such modifications and enhancements are intended to belong to various embodiments of the disclosure.

What is claimed is:

1. A computer-implemented method of providing resiliency to a redundant array of independent disk (RAID) group which includes a plurality of storage devices, the method comprising:
operating the RAID group in a normal state in which each storage device is (i) initially online to perform write and read operations and (ii) configured to go offline in response to a respective media error count for that storage device reaching an initial take-offline threshold;
receiving a notification that a storage device of the RAID group has encountered a particular error situation; and
in response to the notification, transitioning the RAID group from the normal state to a high resiliency degraded state in which each storage device that is operable is (i) still online to perform write and read operations and (ii) configured to stay online even when the respective media error count for that storage device reaches the initial take-offline threshold;
wherein receiving the notification includes electronically detecting that a first storage device of the RAID group has gone offline in response to the media error count for the first storage device reaching the initial take-offline threshold; and
wherein transitioning includes electronically preventing a second storage device of the RAID group from going offline in response to the media error count for the second storage device reaching the initial take-offline threshold,
the RAID group thereby made to operate in the high resiliency degraded state in which the second storage device remains online performing write and read operations even though the media error count of the second storage device has reached the initial take-offline threshold.

2. A computer-implemented method as in claim 1 wherein preventing includes:
configuring the second storage device to remain online regardless of a respective media error count for the second storage device.

3. A computer-implemented method as in claim 2 wherein electronically detecting includes:
receiving, as the notification, an alert indicating that the first storage device has gone offline in response to a respective media error count for the first storage device reaching the initial take-offline threshold.

4. A computer-implemented method as in claim 2, further comprising:
receiving an alert indicating that a proactive copy operation has begun in response to an accounting for the first storage device reaching an end-of-life threshold, the proactive copy operation involving proactively copying data from the first storage device of the RAID group to a spare storage device.

5. A computer-implemented method as in claim 4, further comprising:
proactively copying data from the first storage device of the RAID group to the spare storage device while all of the storage devices of the RAID group remain online to perform write and read operations.

6. A computer-implemented method as in claim 4, further comprising:
reconstructing data that was not proactively copied from the first storage device of the RAID group to the spare storage device, and storing that reconstructed data on the spare storage device.

7. A computer-implemented method as in claim 2 wherein processing circuitry maintains a hierarchy of objects representing the RAID group; and wherein electronically detecting includes:
obtaining, by a RAID group object of the hierarchy, an alert indicating existence of the particular error situation, the RAID group object representing the RAID group.

8. A computer-implemented method as in claim 7 wherein electronically preventing includes:

providing a respective don't-take-offline command from the RAID group object of the hierarchy to a storage device object of the hierarchy, the storage device object of the hierarchy representing the second storage device of the RAID group.

9. A computer-implemented method as in claim 1 wherein preventing the second storage device of the RAID group from going offline includes:
sending, from processing circuitry and to the second storage device, a command that disables the second storage device from going offline in response to the media error count for the second storage device reaching the initial take-offline threshold.

10. A computer program product having a non-transitory computer readable medium which stores a set of instructions to provide resiliency to a redundant array of independent disk (RAID) group which includes a plurality of storage devices, the set of instructions, when carried out by computerized circuitry, causing the computerized circuitry to perform a method of:
operating the RAID group in a normal state in which each storage device is (i) initially online to perform write and read operations and (ii) configured to go offline in response to a respective media error count for that storage device reaching an initial take-offline threshold;
receiving a notification that a storage device of the RAID group has encountered a particular error situation; and
in response to the notification, transitioning the RAID group from the normal state to a high resiliency degraded state in which each storage device that is operable is (i) still online to perform write and read operations and (ii) configured to stay online even when the respective media error count for that storage device reaches the initial take-offline threshold;
wherein receiving the notification includes electronically detecting that a first storage device of the RAID group has gone offline in response to the media error count for the first storage device reaching the initial take-offline threshold; and
wherein transitioning includes electronically preventing a second storage device of the RAID group from going offline in response to the media error count for the second storage device reaching the initial take-offline threshold,
the RAID group thereby made to operate in the high resiliency degraded state in which the second storage device remains online performing write and read operations even though the media error count of the second storage device has reached the initial take-offline threshold.

11. A computer program product as in claim 10 wherein electronically preventing includes:
configuring the second storage device to remain online regardless of a respective media error count for the second storage device.

12. A computer program product as in claim 11 wherein electronically detecting includes:
receiving, as the notification, an alert indicating that the first storage device has gone offline in response to a respective media error count for the first storage device reaching the initial take-offline threshold.

13. A computer program product as in claim 11, further comprising:
receiving an alert indicating that a proactive copy operation has begun in response to an accounting for the first storage device reaching an end-of-life threshold, the proactive copy operation involving proactively copying data from the first storage device of the RAID group to a spare storage device.

14. A computer program product as in claim 11 wherein processing circuitry maintains a hierarchy of objects representing the RAID group; and wherein electronically detecting includes:
obtaining, by a RAID group object of the hierarchy, an alert indicating existence of the particular error situation, the RAID group object representing the RAID group.

15. A computer program product as in claim 14 wherein electronically preventing includes:
providing a respective don't-take-offline command from the RAID group object of the hierarchy to a storage device object of the hierarchy, the storage device object of the hierarchy representing the second storage device of the RAID group.

16. A computer program product as in claim 10 wherein preventing the second storage device of the RAID group from going offline includes:
sending, from the computerized circuitry and to the second storage device, a command that disables the second storage device from going offline in response to the media error count for the second storage device reaching the initial take-offline threshold.

17. Data storage equipment, comprising:
a set of host interfaces to interface with a set of host computers;
a redundant array of independent disk (RAID) group which includes a plurality of storage devices to store host data on behalf of the set of host computers; and
control circuitry coupled to the set of host interfaces and the RAID group, the control circuitry being constructed and arranged to:
operate the RAID group in a normal state in which each storage device is (i) initially online to perform write and read operations and (ii) configured to go offline in response to a respective media error count for that storage device reaching an initial take-offline threshold,
receive a notification that a storage device of the RAID group has encountered a particular error situation, and
in response to the notification, transition the RAID group from the normal state to a high resiliency degraded state in which each storage device that is operable is (i) still online to perform write and read operations and (ii) configured to stay online even when the respective media error count for that storage device reaches the initial take-offline threshold;
wherein receiving the notification includes electronically detecting that a first storage device of the RAID group has gone offline in response to the media error count for the first storage device reaching the initial take-offline threshold; and
wherein transitioning includes electronically preventing a second storage device of the RAID group from going offline in response to the media error count for the second storage device reaching the initial take-offline threshold,
the RAID group thereby configured to operate in the high resiliency degraded state in which the second storage device remains online to perform write and read operations even though the media error count of the second storage device has reached the initial take-offline threshold.

18. Data storage equipment as in claim 17 wherein the control circuitry, when electronically preventing, is constructed and arranged to:
configure the second storage device to remain online regardless of the respective media error count for the second storage device.

19. Data storage equipment as in claim 18 wherein the control circuitry, when electronically detecting, is constructed and arranged to:
receive an alert indicating that the first storage device has gone offline in response to a respective media error count for the first storage device reaching the initial take-offline threshold.

20. Data storage equipment as in claim 18 wherein the control circuitry is further constructed and arranged to:
receive an alert indicating that a proactive copy operation has begun in response to an accounting for the first storage device reaching an end-of-life threshold, the proactive copy operation involving proactively copying data from the first storage device of the RAID group to a spare storage device.

21. Data storage equipment as in claim 18 wherein the control circuitry maintains a hierarchy of objects representing the RAID group; and wherein the control circuitry, when electronically detecting, is constructed and arranged to:
obtain, by a RAID group object of the hierarchy, an alert indicating existence of the particular error situation, the RAID group object representing the RAID group.

22. Data storage equipment as in claim 21 wherein the control circuitry, when electronically preventing, is constructed and arranged to:
provide a respective don't-take-offline command from the RAID group object of the hierarchy to a storage device object of the hierarchy, the storage device object of the hierarchy representing the second storage device of the RAID group.

23. Data storage equipment as in claim 17 wherein preventing the second storage device of the RAID group from going offline includes:
sending, from the control circuitry and to the second storage device, a command that disables the second storage device from going offline in response to the media error count for the second storage device reaching the initial take-offline threshold.

* * * * *

UNITED STATES PATENT AND TRADEMARK OFFICE
CERTIFICATE OF CORRECTION

PATENT NO. : 10,013,323 B1
APPLICATION NO. : 14/868577
DATED : July 3, 2018
INVENTOR(S) : Peter Puhov et al.

Page 1 of 1

It is certified that error appears in the above-identified patent and that said Letters Patent is hereby corrected as shown below:

On the Title Page

Item (72) change the name of Inventor 3 from "Wayne E. Garrett" to --Wayne E. Garrett, Jr.--

Signed and Sealed this
Second Day of April, 2019

Andrei Iancu
*Director of the United States Patent and Trademark Office*